United States Patent [19]

Metcalf

[11] Patent Number: 4,609,869
[45] Date of Patent: Sep. 2, 1986

[54] MAGNETIC SENSOR AND CIRCUIT FOR DETECTING THE EDGE OF A TARGET AS IT PASSES THE CENTERLINE OF THE SENSOR

[75] Inventor: Wilbur F. Metcalf, Sarasota, Fla.

[73] Assignee: Electro Corporation, Sarasota, Fla.

[21] Appl. No.: 485,225

[22] Filed: Apr. 13, 1983

[51] Int. Cl.$^4$ .......................... G01B 7/14; H03K 5/53
[52] U.S. Cl. ........................................ 324/208; 328/5; 307/354
[58] Field of Search ............... 324/207, 208, 173, 174, 324/228, 392; 328/5; 307/354, 362; 123/617, 414, 415, 416

[56] References Cited

U.S. PATENT DOCUMENTS

| | | |
|---|---|---|
| 2,973,430 | 2/1961 | Pelino . |
| 3,065,412 | 11/1962 | Rosenthal .................... 324/174 |
| 3,714,509 | 1/1973 | Coleman et al. . |
| 3,787,769 | 1/1974 | Parkinson . |
| 3,944,936 | 3/1976 | Pryor ........................... 307/354 |
| 4,258,324 | 3/1981 | Henrich ........................ 324/208 |

Primary Examiner—Ernest F. Karlsen
Assistant Examiner—Walter E. Snow
Attorney, Agent, or Firm—Wood, Dalton, Phillips, Mason & Rowe

[57] ABSTRACT

A magnetic sensor for detecting the leading edge of a ferrous target as it passes the centerline of the sensor. The magnetic sensor includes a coil output representing the rate of change of magnetic flux as the target passes the sensor. The coil output is differentiated to provide a signal having a zero crossover point corresponding to the time at which the leading edge of the target passes the centerline of the sensor. The differentiated signal is applied to a zero crossover threshold detector to provide a first pulse, the trailing edge of which corresponds to the time at which the target's leading edge is coincident with the sensor centerline. Additional means provide a second pulse whose leading edge corresponds to the time at which the leading edge of the target is coincident with the centerline of the sensor.

9 Claims, 4 Drawing Figures

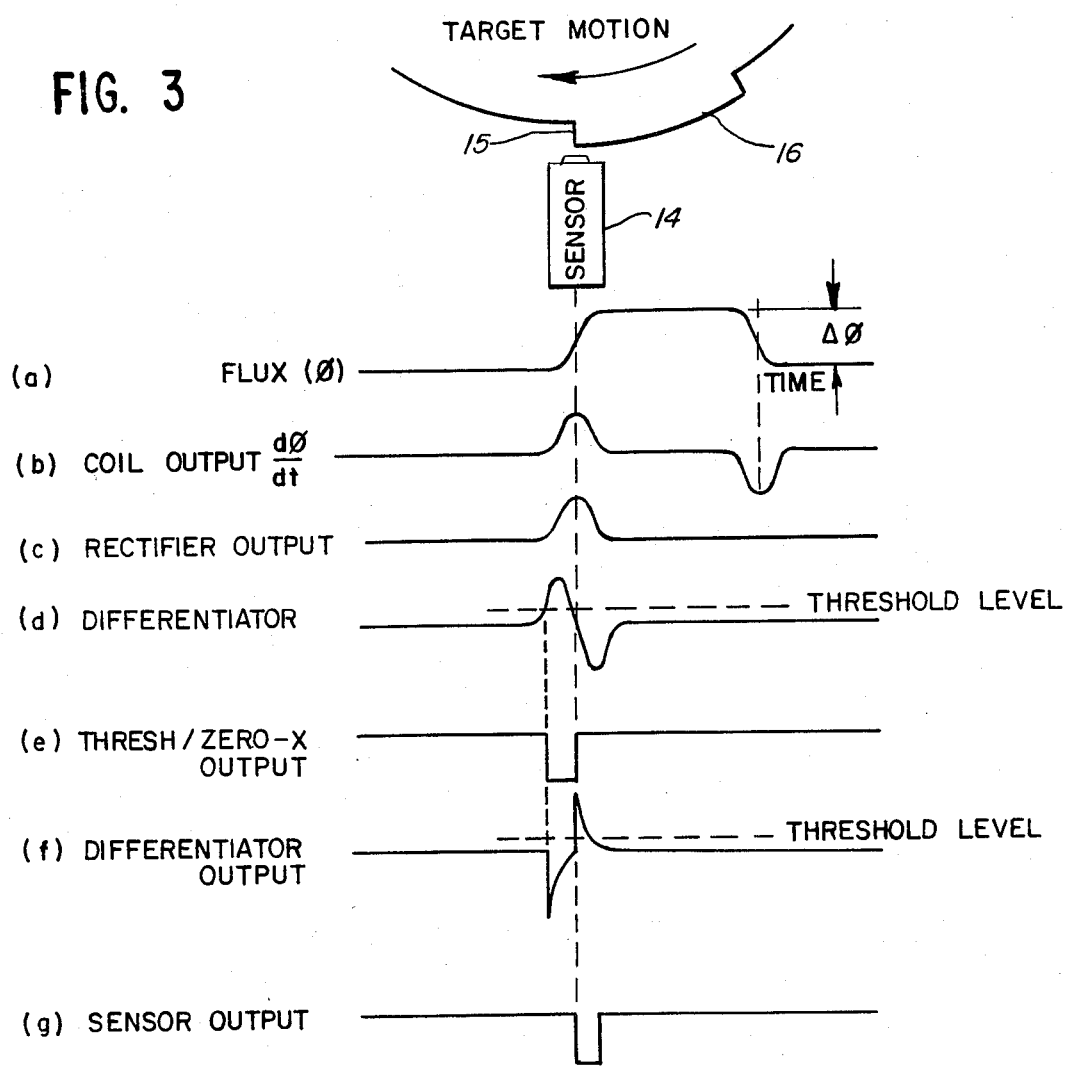
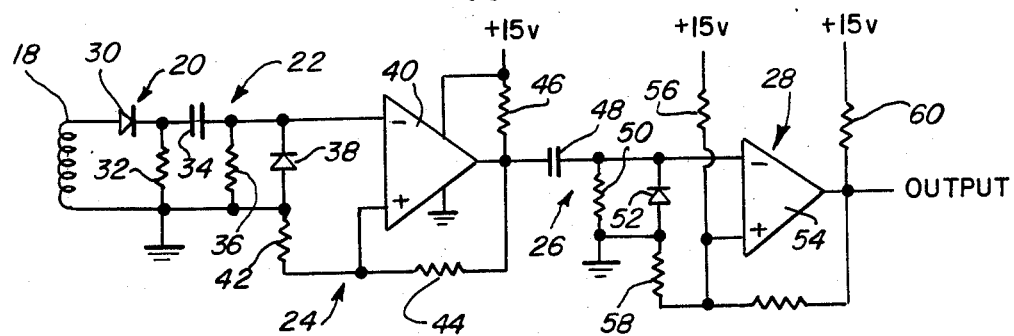

MAGNETIC SENSOR AND CIRCUIT FOR DETECTING THE EDGE OF A TARGET AS IT PASSES THE CENTERLINE OF THE SENSOR

BACKGROUND OF THE INVENTION

The present invention relates to a magnetic sensor and more particularly to a magnetic sensor for detecting the leading edge of a ferrous target as it passes the centerline of the sensor.

Known magnetic sensors, separated from a ferrous target by a gap, typically measure the rate of change of magnetic flux in the gap as the target passes the sensor to provide a signal representative thereof. The rate of change signal is then applied directly to a threshold circuit which compares the signal to a reference to provide an output pulse when the reference is exceeded. The time of occurrence of the leading edge of the output pulse from such a sensor varies as a function of the peak level of the rate of change signal which, in turn, varies as a function of the size of the gap and the speed of the target.

For a relatively narrow target such as a tooth of a rotating gear or a narrow projection on a rotating shaft, in the known magnetic sensors, hysteresis may be added to the threshold circuit to adjust the circuit such that the trailing edge of the output pulse corresponds to the time at which the centerline of the target is coincident with the centerline of the sensor. The output pulse of the threshold circuit may then be used in applications requiring precise timing of the pulse. When the target is relatively wide, in precise timing applications, the time at which the leading edge of the target passes the centerline of the sensor becomes important. However, when known magnetic sensors are used to detect relatively wide targets, neither the leading nor trailing edge of the sensor output provides a precise indication of the time at which the leading edge of the target is coincident with the centerline of the sensor.

SUMMARY OF THE INVENTION

In accordance with the edge sensing magnetic sensor of the present invention, the disadvantages of prior magnetic sensors have been overcome. The edge sensing magnetic sensor is responsive to the leading edge of a target to provide an output pulse having an edge corresponding to the time at which the leading edge of the target is coincident with the centerline of the sensor for wide targets as well as narrow ones.

The edge sensing magnetic sensor includes means for sensing the rate of change of magnetic flux in the gap separating the sensor and target to provide a signal representative thereof. The rate of change signal is differentiated and applied to a zero crossover threshold level detector which provides an output pulse whose trailing edge corresponds to the time at which the leading edge of the target is coincident with the centerline of the sensor.

The edge sensing magnetic sensor further includes a second differentiator and threshold level detector responsive to the output of the zero crossover threshold detector to provide a second pulse whose leading edge corresponds to the time at which the leading edge of the target is coincident with the centerline of the sensor.

The output of the edge sensing magnetic sensor of the present invention provides a precise indication of the time at which the leading edge of the target is coincident with the centerline of the sensor independent of changes in the size of the gap separating the target and sensor and of speed changes on the order of 2 to 1.

Further advantages of the invention will be readily apparent from the following specification and from the drawings in which:

FIG. 3 illustrates the timing diagrams for the edge sensing magnetic sensor of FIG. 2 detecting a wide target as shown therein; and FIG. 4 is a schematic diagram of the edge sensing magnetic sensor of FIG. 2.

Figure 1:
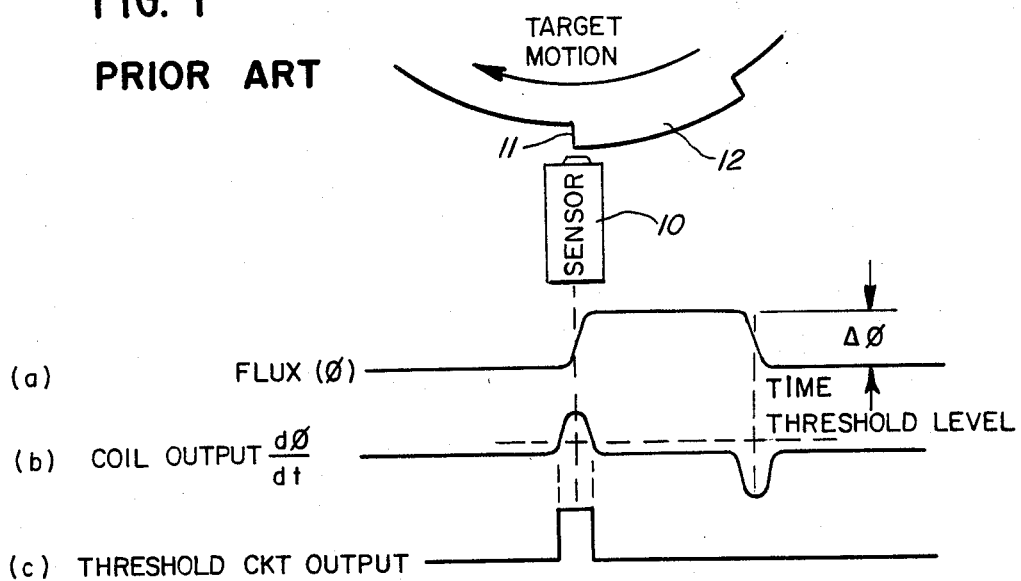
FIG. 1 illustrates the timing diagrams for a prior art magnetic sensor detecting a wide target as shown therein.

FIG. 1 illustrates the response of a typical prior art sensor 10 in detecting a relatively wide target 12 as it moves past the sensor. The sensor 10 has a coil output representing the rate of change of magnetic flux in the gap separating the target and the sensor, the flux being depicted in FIG. 1a and the coil output being depicted in FIG. 1b. The coil output is applied to a threshold circuit which compares the rate of change signal to a threshold level reference, the circuit providing a pulse as depicted in FIG. 1c during the time that the rate of change signal exceeds the threshold level reference. As seen in FIG. 1c neither the leading nor the trailing edge of the output pulse from the threshold circuit provides a precise indication of the time at which the leading edge 11 of the target 12 passes the centerline of the sensor 10.

Figure 2:
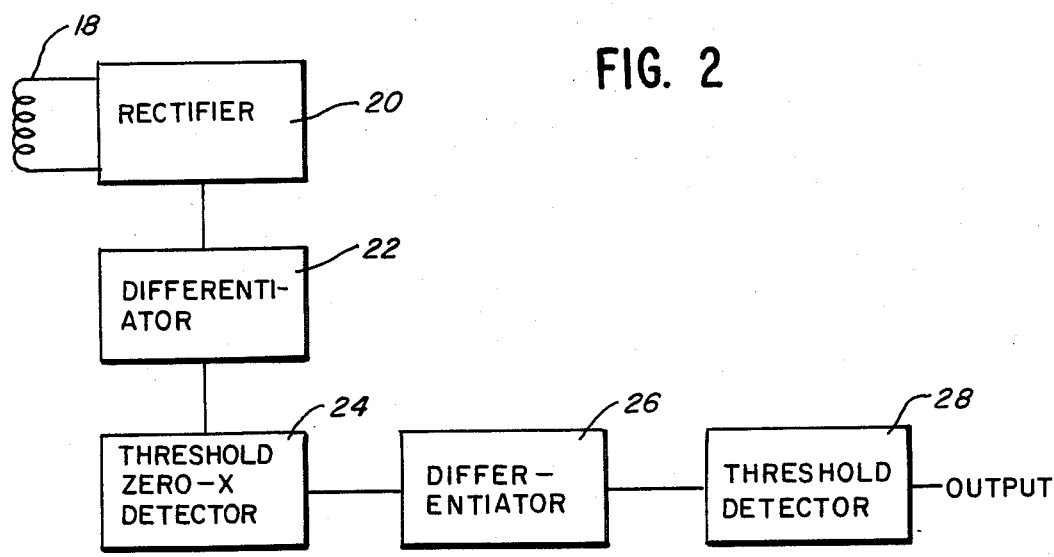
FIG. 2 is a block diagram of the edge sensing magnetic sensor of the present invention.

The edge sensing magnetic sensor 14 of the present invention as shown in FIGS. 2 and 3 overcomes the disadvantages of the prior art sensors to provide an output pulse, an edge of which corresponds to the time at which the leading edge 15 of a relatively wide target 16 is coincident with the centerline of the sensor. The edge sensing magnetic sensor 14 includes a coil 18, the output of which represents the rate of change of magnetic flux as the target passes the sensor, the flux and coil output being depicted in FIGS. 3a and 3b respectively. The output of the coil 18 is applied to a rectifier 20 which passes only the positive going pulse from the coil as depicted in FIG. 33c. The rectified output is applied to a differentiator 22, the output of which, as depicted in FIG. 3d, has a zero crossover point corresponding to the time at which the leading edge of the target 16 is coincident with the centerline of the sensor 14. The output of the differentiator 22 is then applied to a threshold zero crossover detector 24 which compares the differentiator output to a threshold level reference and which detects the zero crossover point of the differentiator output. The output of the threshold zero crossover detector 24 is a negative going pulse as depicted in FIG. 3e, the pulse having a leading edge corresponding to the time at which the threshold level reference is exceeded by the differentiator output and having a trailing edge corresponding to the zero crossover point of the differentiator output. The trailing edge of the output pulse from the threshold zero crossover detector further corresponds to the time at which the leading edge 15 of the target 16 is coincident with the centerline of the sensor 14 and thus may be used in precise timing applications.

In order that the leading edge of the output pulse provide an indication of the time at which the leading edge of the target is coincident with the centerline of the sensor, a differentiator 26 and series connected threshold detector 28 are provided. In response to the falling edge of the negative going pulse from the detector 24, the differentiator 26 provides a negative going spike and in response to the rising edge of the pulse, the differentiator provides a positive going spike as shown in FIG. 3f. The threshold detector 28 compares the spiked output from the differentiator 26 to a threshold level. As depicted by the sensor output illustrated in FIG. 3g, during the time that the positive going spike exceeds the threshold level, the detector provides a negative going pulse, the leading edge of which corresponds to the time at which the leading edge of the target is coincident with the centerline of the sensor.

The edge sensing magnetic sensor 14 is illustrated in greater detail in FIG. 4. The output of the coil 18 is connected to a diode 30 forming the rectifier 20, the diode being connected to ground through a 47KΩ resistor 32. The positive portion of the coil output, passed by the diode 30, is applied to the differentiator 22 which includes a 0.047 μf capacitor 34 and a 10KΩ resistor 36. A diode 38 connected in parallel with the resistor 36 clips the negative portion of the differentiated signal, the positive portion being applied to an inverting input terminal of an op amp 40 of the threshold zero crossover detector 24.

The op amp 40 of the threshold zero crossover detector 24 compares the differentiator output applied to the inverting input terminal to the threshold level reference voltage applied to the noninverting input terminal of the op amp. The noninverting input terminal of the op amp 40 is connected to ground through a 10KΩ resistor 42 and to +15 volts through a 470KΩ resistor 44 and a 10KΩ resistor 46, the output of the op amp being connected between the resistors 44 and 46. A threshold level reference voltage of approximately +0.3 volts is thus applied to the noninverting input terminal of the op amp. When the differentiator output goes positive and exceeds the +0.3 volt reference, the output of the op amp 40 goes low as shown by the leading edge of the threshold zero crossover detector output depicted in FIG. 3e. When the output of the op amp 40 goes low, the threshold level reference voltage applied to the noninverting input terminal goes to zero. The op amp 40 now detects the zero crossover point of the differentiator output, the output of the op amp going high when the differentiator output goes to zero as indicated by the trailing edge of the output pulse depicted in FIG. 3e. Because the differentiator output goes to zero or crosses zero when the leading edge 15 of the target 16 is coincident with the centerline of the sensor, the trailing edge of the output pulse of the op amp 40 provides a precise indication of this occurrence.

In order that the leading edge of the output of the magnetic sensor provide the indication of the time at which the leading edge 15 of the target 16 is coincident with the centerline of the sensor, the output of the threshold zero crossover detector 24 is applied to the differentiator 26 and the threshold detector 28. The differentiator 26 to which the negative going pulse from the op amp 40 is applied, includes a 0.047 μf capacitor 48 and a 10KΩ resistor 50. A diode 52, connected in parallel with the resistor 50, clips the negative going spike of the differentiator output, the positive going spike of the differentiator output being applied to the inverting input terminal of an op amp 54 of the threshold detector 28. The op amp 54 compares the spiked differentiator output applied to the inverting input terminal to a threshold reference applied to the noninverting input terminal. The noninverting input terminal of the op amp 54 is connected between +15 volts through a 1 MΩ resistor 56 and ground through a 10KΩ resistor 58. The noninverting input terminal is also connected to +15 volts through a 7.5KΩ resistor 60 and a 470KΩ series connected resistor 62, the output of the op amp 54 being connected between the resistors 60 and 62. When the leading edge of the positive going spiked output applied to the inverting input terminal of the op amp 54 exceeds the threshold level applied to the noninverting input terminal of the op amp, the output of the op amp goes low providing the negative going sensor output pulse depicted in FIG. 3g. As seen in FIG. 3g, the output pulse has a leading edge corresponding to the time at which the leading edge 15 of the target 16 is coincident with the centerline of the sensor 14.

The edge sensing magnetic sensor provides a precise timing pulse regardless of the width of the target. Further, the precise timing pulse is provided independent of changes in the size of the gap separating the sensor and target and of changes in the speed of the target on the order of 2 to 1. Although the magnetic sensor 14 has been described as detecting the alignment of the leading edge of the target with the centerline of the sensor, the sensor may also be employed to detect alignment of the trailing edge of the target with the centerline of the sensor, the output of the sensor having either a leading or a trailing edge corresponding to the detected alignment.

I claim:

1. In a magnetic sensor for detecting a ferrous target separated from the sensor by a gap, the sensor having a centerline and means for providing an analog signal representing the rate of change of magnetic flux in the gap as the target passes the sensor moving generally at right angles to said sensor centerline, the target having an edge extending transverse to the direction of relative movement and in the direction of the sensor centerline, means for detecting alignment of an edge of the target with the centerline of the sensor comprising:
   means for differentiating said analog rate of change signal, the analog differentiated signal having a zero crossover point corresponding to the time at which said edge of the target passes the centerline of the sensor; and
   means for detecting the zero crossover point of said analog differentiated signal to provide an output signal which corresponds to the time at which the target edge is conincident with the centerline of the sensor.

2. The magnetic sensor of claim 1 wherein said output signal is a pulse, an edge of which corresponds to the time at which the target edge is coincident with the centerline of the sensor.

3. The magnetic sensor of claim 2 further including means responsive to said output pulse for providing a second pulse having a leading edge corresponding to the time at which the target edge is coincident with the centerline of the sensor.

4. The magnetic sensor of claim 2 wherein a trailing edge of said output pulse corresponds to the time at which the target edge is coincident with the centerline of the sensor further including means for differentiating said output pulse, and means for comparing the output of said pulse differentiating means to a threshold reference to provide a second pulse having a leading edge corresponding to the time at which the target edge is coincident with the centerline of the sensor.

5. In a magnetic sensor for detecting a ferrous target separated from the sensor by a gap, the sensor having a centerline and means for providing an analog signal representing the rate of change of magnetic flux in the gap as the target passes the sensor moving generally at right angles to said sensor centerline, the target having an edge extending transverse to the direction of relative movement and in the direction of the sensor centerline, means for detecting alignment of an edge of the target with the centerline of the sensor comprising:

means for differentiating said analog rate of change signal; and means for comparing the analog differentiated rate of change signal to a reference signal to provide an output pulse having an edge corresponding to the time at which the target edge is conincident with the centerline of the sensor.

6. The magnetic sensor of claim 5 further including means responsive to said output pulse for providing a second pulse having a leading edge corresponding to the time at which said target edge is coincident with the centerline of said sensor.

7. The magnetic sensor of claim 5 wherein a trailing edge of said output pulse corresponds to the time at which the target edge is coincident with the centerline of the sensor, further including means for differentiating said output pulse, and means for comparing said differentiated pulse to a second reference signal to provide a second pulse having a leading edge corresponding to the time at which said target edge is conincident with the centerline of the sensor.

8. The magnetic sensor of claim 2 wherein said detecting means comprises a circuit having an operational amplifier to produce said pulse wherein a leading edge of the pulse corresponds to the time at which the analog differentiated signal exceeds a non-zero threshold level and a trailing edge of the pulse corresponds to the zero crossover point of the differentiated analog signal.

9. The magnetic sensor of claim 5 wherein said comparing means comprises a circuit having an operational amplifier to produce said pulse wherein a leading edge of the pulse corresponds to the time at which the analog differentiated signal exceeds a non-zero threshold level and a trailing edge of the pulse corresponds to the zero crossover point of the analog differentiated signal.

* * * * *